United States Patent
Stepanov et al.

(10) Patent No.: US 6,788,713 B1
(45) Date of Patent: Sep. 7, 2004

(54) REDUCTION OF PULSATIONS IN DFB LASERS

(75) Inventors: Dmitrii Stepanov, Dulwich Hill (AU); Zourab Brodzeli, Bexley (AU)

(73) Assignee: The University of Sydney, Sydney (AU)

( * ) Notice: Subject to any disclaimer, the term of this patent is extended or adjusted under 35 U.S.C. 154(b) by 0 days.

(21) Appl. No.: 09/831,995

(22) PCT Filed: Nov. 17, 1999

(86) PCT No.: PCT/AU99/01019

§ 371 (c)(1),
(2), (4) Date: May 16, 2001

(87) PCT Pub. No.: WO00/30224

PCT Pub. Date: May 25, 2000

(30) Foreign Application Priority Data

Nov. 17, 1998 (SU) .............................. PP7163

(51) Int. Cl.⁷ .......................... H01S 3/30; H01S 3/113; H01S 3/08; G02F 1/335; G02B 27/44
(52) U.S. Cl. .............................. 372/6; 372/11; 372/96; 372/99; 385/10; 385/37; 359/568
(58) Field of Search .......................... 372/6, 11, 29.021, 372/50, 96, 99, 29.014; 385/10, 37; 359/568

(56) References Cited

U.S. PATENT DOCUMENTS

| 5,103,456 A | * | 4/1992 | Scifres et al. .................. 372/50 |
| 5,184,247 A | | 2/1993 | Schimpe |
| 5,485,481 A | * | 1/1996 | Ventrudo et al. ............... 372/6 |
| 5,646,951 A | * | 7/1997 | Fischer et al. ................. 372/19 |
| 5,754,572 A | | 5/1998 | Pinto et al. |
| 6,078,597 A | * | 6/2000 | Feuer ............................ 362/6 |

FOREIGN PATENT DOCUMENTS

| JP | 091686394 | 7/1997 |
| WO | WO 9533020 | 11/1995 |

* cited by examiner

Primary Examiner—Don Wong
Assistant Examiner—Armando Rodriguez
(74) Attorney, Agent, or Firm—Ladas & Parry

(57) ABSTRACT

Output power fluctuations in a distributed feedback laser arrangement are reduced by inducing a saturable absorption grating in a saturable absorption region. Light is coupled into a DFB region and amplified in an amplification region. A feedback loop reflects a portion of the amplified light, and the counter-propagating beams induce an absorption grating in a saturable absorption region which suppresses output oscillations. The amplification region can comprise an erbium doped fiber, and the saturable absorption region can comprise an underpumped portion of such a fiber, or a further length of such fiber, or a planar waveguide.

19 Claims, 5 Drawing Sheets

REDUCTION OF PULSATIONS IN DFB LASERS

FIELD OF THE INVENTION

The present invention relates to a method of reducing intensity pulsation in distributed feedback (DFB) lasers, e.g. in DFB fibre lasers.

BACKGROUND OF THE INVENTION

The utilisation of optical fibre networks in telecommunications is becoming more and more prevalent due to their high bandwidth capabilities. Further, with the recent introduction of erbium doped fibre amplifiers (EDFA) wavelength division multiplexing (WDM) systems are being introduced so as to multiplex multiple channels. The increase in WDM density places more stringent requirements on the principles of operation. This requires laser transmitters with accurate wavelength selection and high wavelength stability, in addition to low power output fluctuations.

Fibre lasers such as Er-doped DFB fibre lasers in general are ideally suitable as they are fully fibre-compatible allowing for very low coupling losses. The potential of DFB fibre lasers as low noise, narrow linewidth sources for WDM systems has been demonstrated recently in digital transmission tests. Further, with a passive temperature-compensated package, the wavelength stability of DFB fibre lasers could be set better than 1 GHz within −20/+80° C. temperature range.

However, due to self-pulsation in Er-doped DEB lasers, there exist power fluctuations in the output of such lasers. The origin of self-pulsations is related to ion clustering at high erbium concentrations [Sanchez et. al. Phys. Rev. A, 48(3), 2220–22293]. The clusters act as saturable absorbers with switching time much shorter than the population inversion recovery time and can eventually result in spiking behaviour of the laser.

Reducing the erbium concentration whilst still providing enough gain in a short cavity DFB fibre laser can be achieved by Yb co-doping [Kringlebotn et. al. IEEE Photon. Technology Letters 5(10) 1162–1164 (1993)] which increases the pumping efficiency. However, where it is desired to arrange several DFB fibre lasers in series, this method can have the disadvantage that the Yb dopant absorbs a significant portion of the pumping energy, and therefore separate pumping sources would typically be required.

Stabilisation of the laser against self-pulsations can also be accomplished by resonant pumping [Loh et al, Optics Letters 21(18), 1475–1477 (1996)] or co-pumping [Loh et. al. Optics Letters, 22(15), 1174–1176 (1997)] directly into the metastable Er-ion state, damping down the oscillations of the population inversion. However, this approach has the disadvantage that the pumping wavelength would lie close to the signal wavelength. Presently, sources for wavelengths close to commonly used signal wavelengths of around 1480 nm are quite expensive.

SUMMARY OF THE INVENTION

The present invention provides a method of reducing fluctuations in the output power of a distributed feedback laser arrangement incorporating a waveguide structure having a distributed feedback region, a signal amplification region for amplifying an output of the distributed feedback region and a saturable absorption region, the method comprising using light from the distributed feedback region to induce a saturable absorption grating in the saturable absorption region.

The method may be effected in a laser arrangement wherein the saturable absorption region is provided at one end of said signal amplification region.

The method may be effected in a laser arrangement wherein said saturable absorption region forms part of said signal amplification portion.

The method may be effected in a laser arrangement wherein said signal amplification region is in a feedback loop with said distributed feedback region.

Said feedback loop may be formed by coupling a portion of an output of said signal amplification region to said distributed feedback region.

Said distributed feedback laser region may be formed from Erbium doped fibre.

Said signal amplification region may be formed from Erbium doped fibre.

Said saturable absorption region may be formed from Erbium doped fibre.

The feedback loop may provide a phase-conjugated feedback signal to the output of the distributed feedback region.

The feedback signal may provide resonant pumping as well as saturate gain in the distributed-feedback region to the threshold value.

The method may be effected in a laser arrangement wherein a number of said distributed feedback regions are connected in series.

One signal amplification region and one saturable absorption region and one feedback loop may be shared between said distributed feedback regions to form the arrangement.

The method may be effected in a laser arrangement wherein the distributed feedback region comprises a Bragg grating structure.

The Bragg grating structure may comprise a chirped Bragg grating.

The Bragg grating structure may comprise a sampled Bragg grating.

The Bragg grating structure may comprise a phase shifted Bragg grating.

The grating structure may comprise an apodised grating.

The method may be effected in a laser arrangement wherein the waveguide structure comprises a planar waveguide.

The distributed feedback region may be in the form of a planar waveguide.

The signal amplifying region may be in the form of a planar waveguide.

The saturable absorption region may be in the form or a planar waveguide.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

Figure 1:
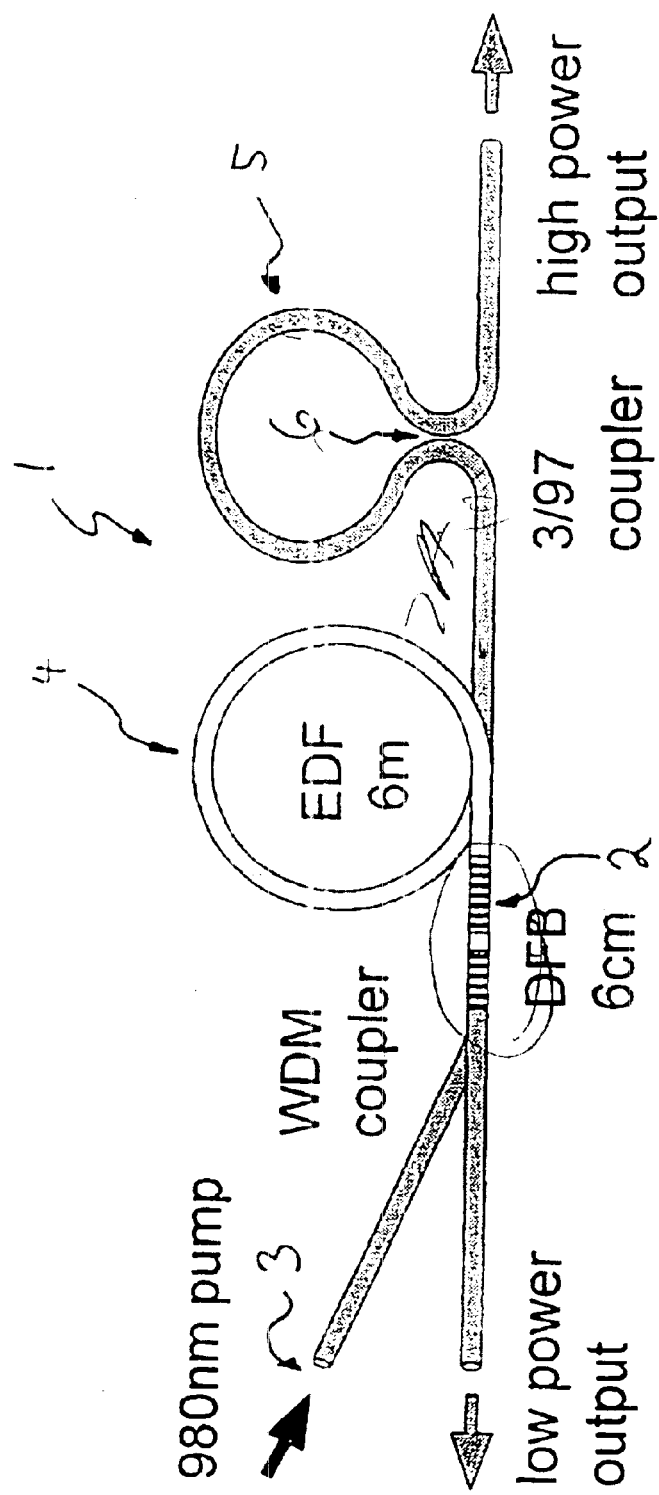
FIG. 1 is a schematic illustration of the arrangement of the preferred embodiment.

Turning initially to FIG. 1, there is illustrated the preferred arrangement 1 in which a 6 cm long DFB structure 2 was written in an erbium doped fibre. The DFB was pumped by a 980 nm pump 3. The DFB structure 2 absorbed only approximately 20% of the launched pump power producing approximately 0.5 mW of output. The rest of the pump power was used to pump a section of low concentration Er-doped fibre 4. The fibre was available commercially as EDF-2 from Redfern Fibres of Australian Technology Park, Redfern, NSW, Australia. The EDF section 4 acts as a power amplifier to scale the laser output of DFB structure 2 to approximately 10 mW.

The DFB master oscillator 2 was not isolated from the amplifier section 4 and its performance was affected by an intentionally induced feedback provided by a low reflectivity loop mirror 5 which was based on a coupler 6 which provided a 3% output coupler in ratio. The feedback provides a counter propagating wave in the power amplifier.

The technique of suppressing output oscillations relies on the process of saturable absorption at the end of the amplifier section 4.

Figure 2:
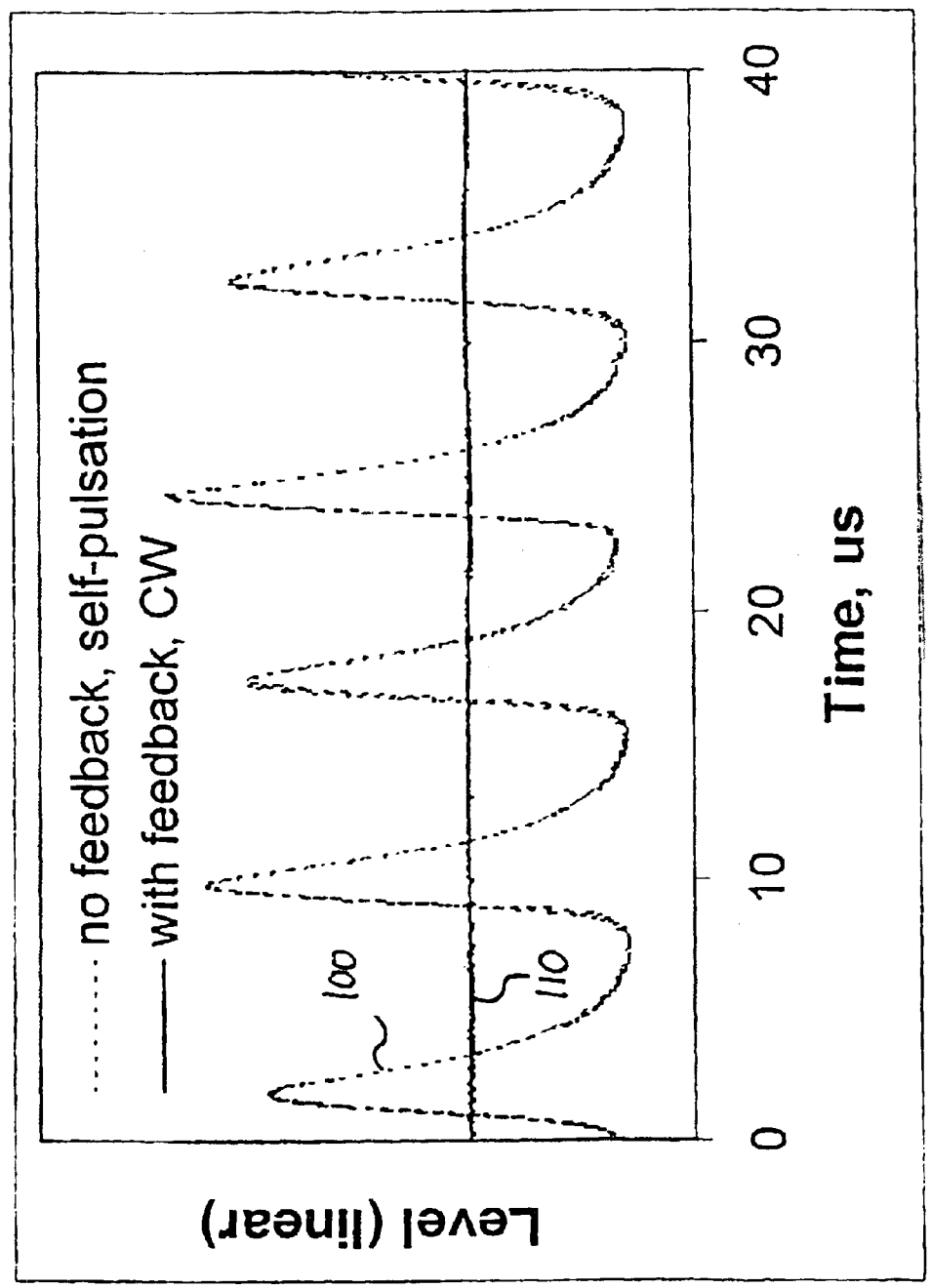
FIG. 2 illustrates the dynamics of the laser output with and without feedback.
Figure 3:
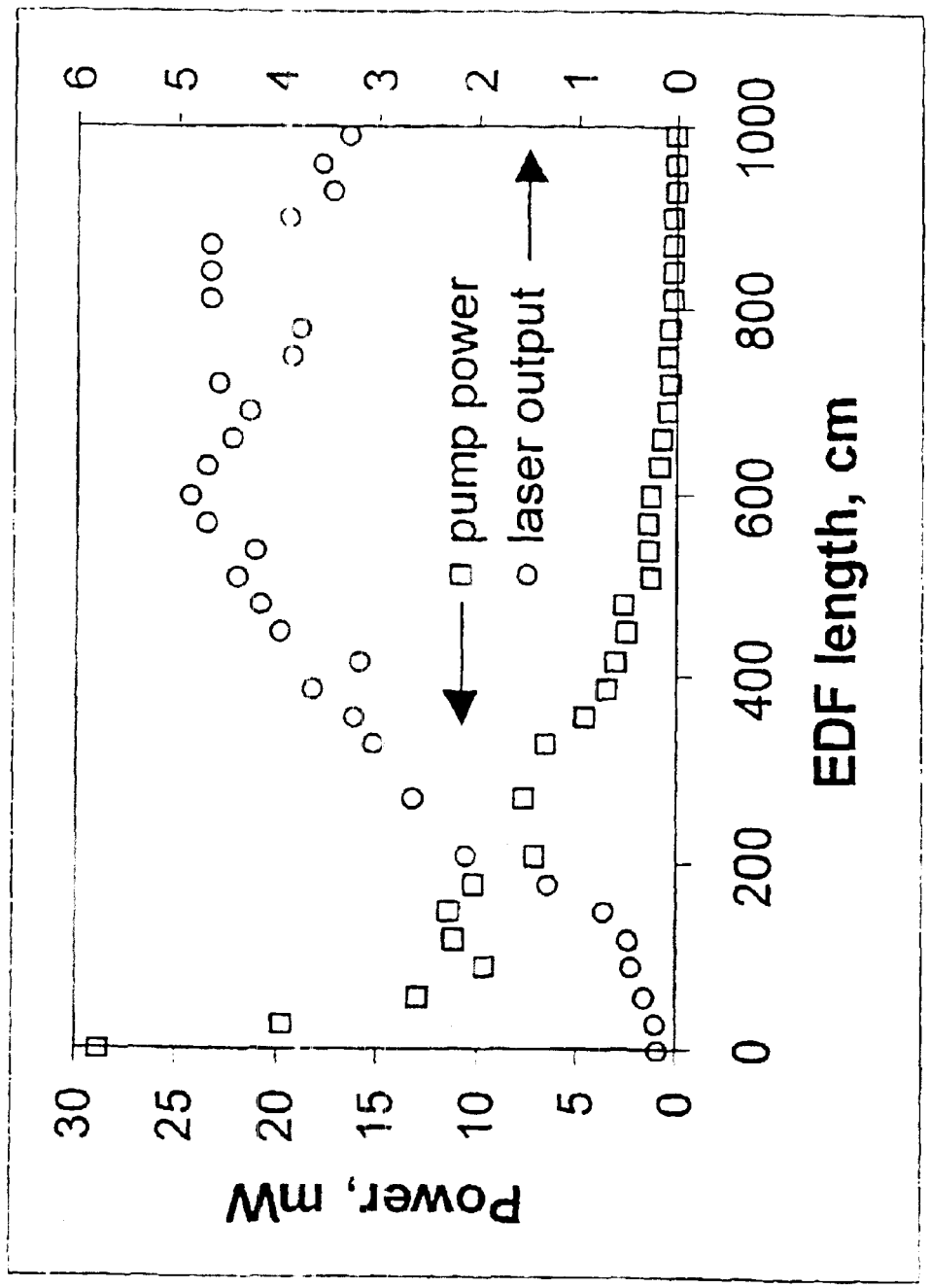
FIG. 3 illustrates power distribution along the power amplifier at 47 mW of launched 980 nm pump power.

Without the feedback from the mirror 5 the laser exhibited self-pulsations (curve 100 in FIG. 2). With the mirror 5, however, it operates in cw mode (see curve 110 in FIG. 2). As illustrated in FIG. 3, a long section of the power amplifier 4 is under-pumped, i.e. it produces loss rather than gain. Accordingly, in the preferred embodiment an absorption grating can be induced in that section of the power amplifier by the interference pattern of the counter-propagating waves due to the saturable nature of absorption in Er-doped fibres. It will be appreciated, however, that alternatively a further length of Er-doped fibre or saturable absorption region in another form could be provided.

The process of four-wave mixing ensures that the feedback signal is phase-conjugated to the DFB output, eliminating the effect of environmental perturbations on the phase of the feedback signal. The four waves involved in the four-wave mixing are I) a first outgoing wave from the DFB, which interferes with II) a reflected wave from the mirror 5, and III) a further outgoing wave from the DFB, with IV) the resultant scattered wave. The amplified feedback signal provides resonant pumping as well as saturates the gain of the DFB to the threshold value, damping down relaxation oscillations in the population inversion. Additionally, the DFB is injection locked to the feedback signal which is always within the locking range of the laser.

Figure 4:
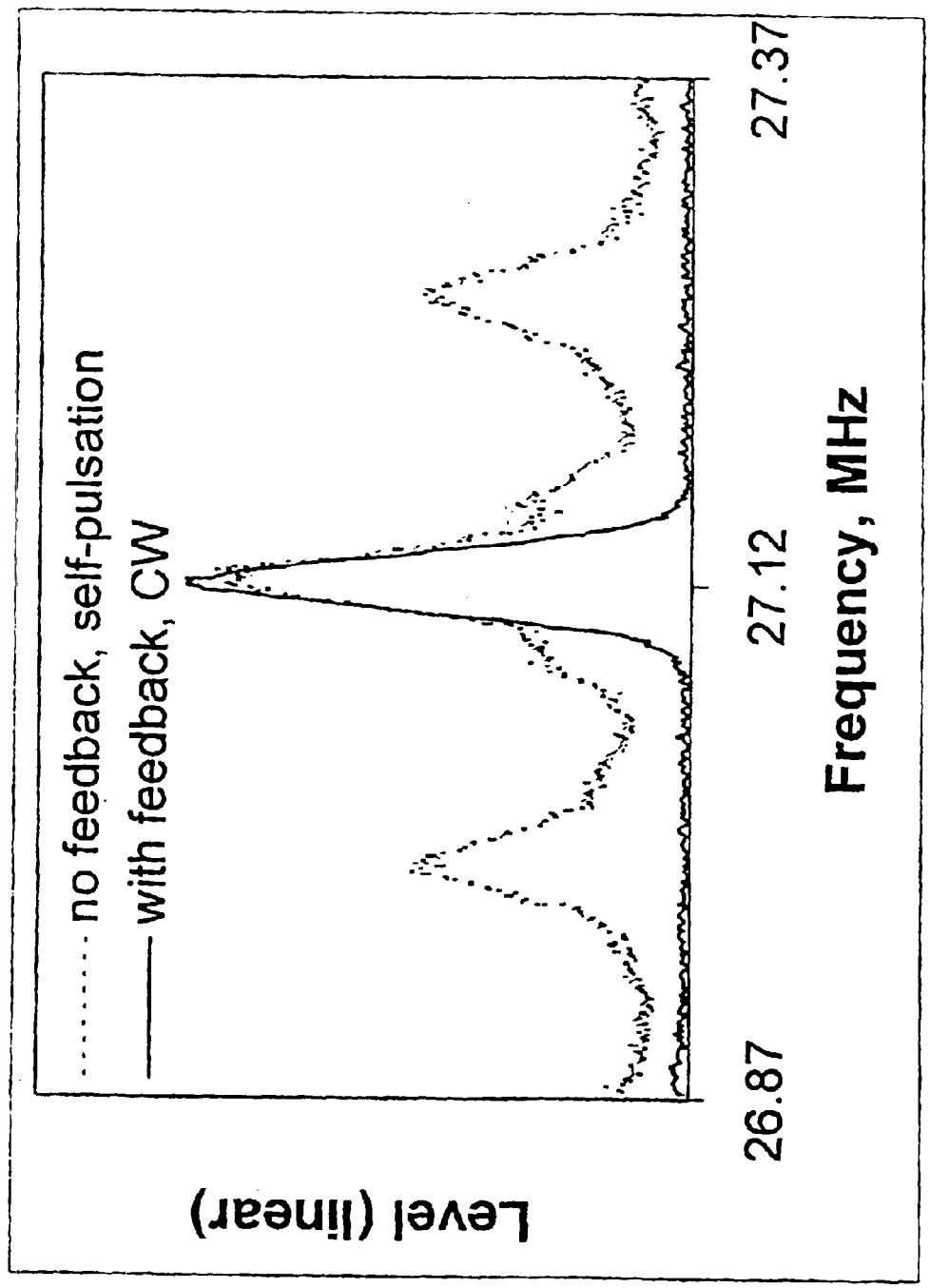
FIG. 4 illustrates the laser line width measured with and without feedback.

Alternatively, the laser can be viewed as a four-mirror cavity, which can be described using the approach suggested in [Horowitz, R. Daisy, and B. Fischer, Opt. Lett., 21(4), 299–301 (1996)]. In the present case the filtering effect is primarily related to the phase discrimination properties of the absorption grating which discriminates the modulation sidebands (FIG. 4) with respect to the carrier frequency since they are not necessarily correlated in phase.

Figure 5:
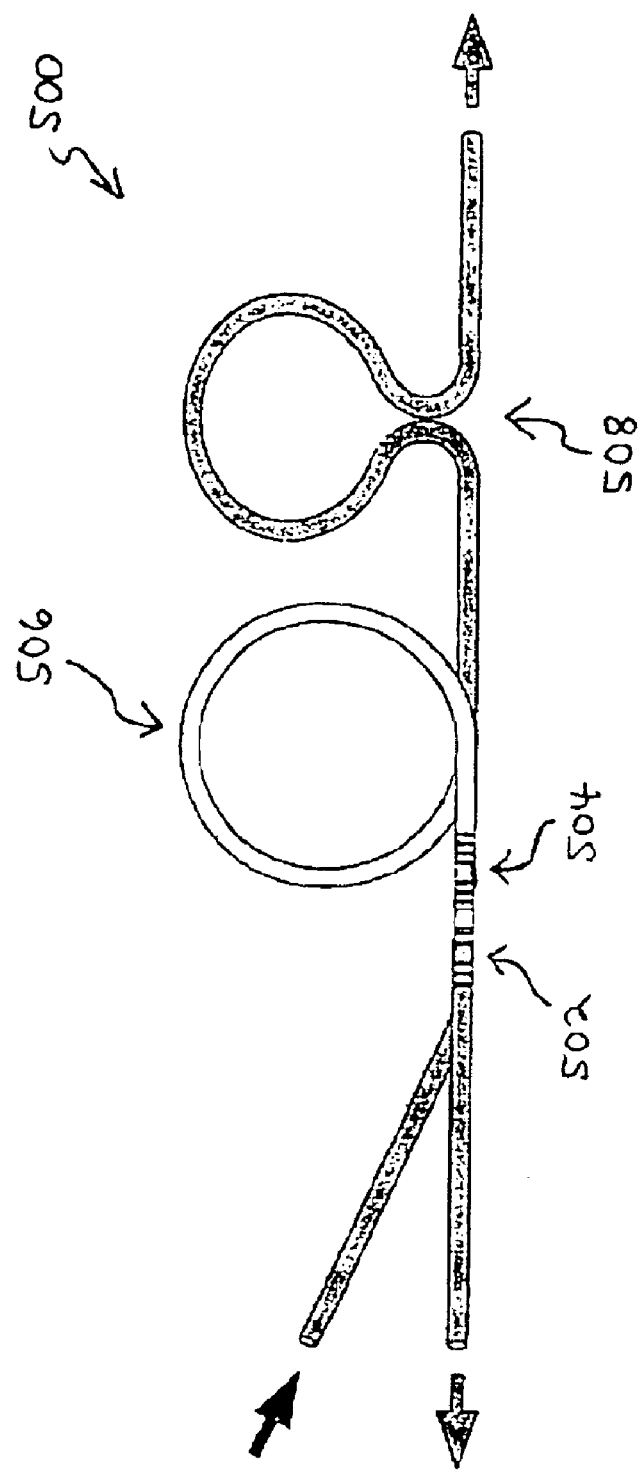
FIG. 5 illustrates a laser arrangement embodying the present invention.

An alternative embodiment of the present invention is shown in FIG. 5. In that embodiment, a laser arrangement 500 comprises a plurality of distributed feedback regions 502, 504 connected in series. One saturable absorption region 506 and one loop 508 are shared between the distributed feedback regions 502, 504 to form laser arrangement 500.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A method of reducing power fluctuations in an output of a laser, the method comprising the steps of:

generating a laser signal utilizing a distributed feedback laser cavity, redirecting a signal portion of th)e laser signal back towards the laser cavity, and inducing a saturable absorption grating in a saturable absorption element external to the laser cavity in the optical path of the laser signal as a result of wave mixing of the laser signal and the redirected signal portion, whereby, in use, phase-discriminating properties of the induced saturable absorption grating in the optical path of the laser signal provide a phase-conjugated feedback signal for introduction into the laser cavity for reducing power fluctuations in an optical output of the laser cavity.

2. A method as claimed in claim 1, wherein the method further comprises the step of post-amplifying the laser signal externally from the laser cavity and prior to the redirecting of the signal portion of the laser signal.

3. A method as claimed in claim 1, wherein the phase-discriminating properties of the induced saturable absorption grating provide a signal for resonant pumping as well as for saturating gain in the laser cavity.

4. A method as claimed in claim 1, wherein the method comprises the step of generating the laser signal utilizing a plurality of laser cavities connected in series.

5. A method as claimed in claim 4, wherein one saturable absorption element external to the laser cavities, one saturable absorption grating and one optical redirecting element for redirecting the portion of the laser output are shared between the laser cavities.

6. A method as claimed in claim 1, wherein the step of generating the laser signal comprises utilizing a Bragg grating structure.

7. A method as claimed in claim 6, wherein the Bragg grating structure comprises one or more of a group comprising a chirped Bragg grating, a sampled Bragg grating, a phaseshifted Bragg grating, and an apodized Bragg grating.

8. A laser structure comprising:

a distributed feedback laser cavity for generating a laser signal, an optical signal redirecting element external to the laser cavity and disposed in the optical path of the laser signal for redirecting a signal portion of the laser signal back towards the laser cavity, and a saturable absorption element external to the laser cavity and disposed in the optical paths of the laser signal and of the redirected signal portion for inducing a saturable absorption grating in the saturable absorption element in the optical path of the laser signal as a result of wave mixing of the laser signal and the redirected signal portion, whereby, phase-discriminating properties of the induced saturable absorption grating in the optical path of the laser signal provide a phase-conjugated feedback signal for introduction into the laser cavity for reducing power fluctuations in an optical output of the laser cavity.

9. A laser structure as claimed in claim 8, further comprising:
an optical signal amplification element disposed in the optical path of the laser signal between the output of the laser cavity and the redirecting element, for post-amplifying the laser signal from the laser cavity.

10. A laser structure as claimed in claim 9, wherein the saturable absorption element is disposed at one end of the signal amplification element in the optical path of the laser signal.

11. A laser structure as claimed in claim 9, wherein the saturable absorption element is integrated with the signal amplification element in the optical path of the laser signal.

12. A laser structure as claimed in claim 9, wherein one or more of a group comprising the laser cavity, the signal amplification element, and the saturable absorption element are formed from erbium doped fiber.

13. A laser structure as claimed in claim 8, wherein the laser structure is arranged in a manner such that the phase-discriminating properties of the saturable absorption grating provide a signal for resonant pumping as well as for saturating gain in the laser cavity to a threshold value.

14. A laser structure as claimed in claim 8, comprising a plurality of distributed feedback laser cavities connected in series for generating the laser signal.

15. A laser structure as claimed in claim 14, wherein one saturable absorption element and one optical redirecting element are provided in the optical path of the laser signal after the plurality of laser cavities and are shared by the laser cavities.

16. A laser structure as claimed in claim 8, wherein the laser cavity comprises a Bragg grating structure.

17. A laser structure as claimed in claim 16, wherein the Bragg gating structure comprises one or more of a group comprising a chirped Bragg grating a sampled Bragg grating, a phaseshifted Bragg grating, and an apodized Bragg grating.

18. A laser structure a claimed in claim 9, wherein one or more of a group comprising the laser cavity, the signal amplification element, the saturable absorption element and the optical redirecting element are in the form of planar waveguides.

19. An external feedback device for a distributed feedback laser cavity, the feedback device comprising:
an interconnecting element for coupling a laser signal from an output of the distributed feedback laser cavity into the external feedback device,
an optical signal redirecting element disposed in the optical path of the laser signal within the external feedback device for redirecting a signal portion of the laser signal back towards the interconnecting element, and
a saturable absorption element disposed in the optical paths of the laser signal and of the redirected signal portion within the external feedback device for inducing a saturable absorption grating in the saturable absorption element in the optical path of the laser signal as a result of wave mixing of the laser signal and the redirected signal portion,
whereby, the external feedback device is arranged in a manner such that phase-discriminating properties of the induced saturable absorption grating in the optical path of the laser signal provide to the interconnecting element a phase-conjugated feedback sill for introduction into the laser cavity for reducing power fluctuations in the optical output of the laser cavity.

* * * * *